United States Patent

Garrod

(10) Patent No.: US 6,234,163 B1
(45) Date of Patent: May 22, 2001

(54) FLUE DUCTING FOR ATMOSPHERIC BOILERS

(76) Inventor: John Trevor Garrod, Picktree Barn, Picktree Village, Washington, Tyne & Wear, NE38 9HH (GB)

( * ) Notice: Subject to any disclaimer, the term of this patent is extended or adjusted under 35 U.S.C. 154(b) by 0 days.

(21) Appl. No.: 09/302,203

(22) Filed: Apr. 29, 1999

(30) Foreign Application Priority Data

Apr. 30, 1998 (GB) .................................................. 9809148

(51) Int. Cl.[7] .................................................. F24C 1/14
(52) U.S. Cl. .............................. 126/80; 454/44; 138/122; 138/113; 138/114; 126/307 R
(58) Field of Search .................................. 126/80, 307 R; 459/1, 44; 165/184; 138/121, 122, 113, 114, 145, 148

(56) References Cited

U.S. PATENT DOCUMENTS

| 54,830 | * | 5/1866 | Eaton | 126/80 |
|---|---|---|---|---|
| 564,817 | * | 7/1896 | Barrier | 126/80 |
| 675,447 | * | 6/1901 | McMahon | 138/148 |
| 904,199 | * | 11/1908 | Harris | 126/307 R |
| 1,409,324 | * | 3/1922 | Willett | 126/307 R |
| 1,523,006 | * | 1/1925 | Dunning | 126/307 R |
| 1,988,642 | * | 1/1935 | Wolberg | 126/307 R |
| 2,076,210 | * | 4/1937 | Stadtfeld | 126/307 R |
| 2,409,304 | * | 10/1946 | Morrison | 138/122 |
| 2,462,383 | * | 2/1949 | Goodwin | 126/307 R |
| 2,475,389 | * | 7/1949 | Hersey, Jr. | 138/122 |
| 2,512,116 | * | 6/1950 | Siebels | 126/307 R |
| 2,619,022 | * | 11/1952 | Hergenrother | 126/80 |
| 2,674,297 | * | 4/1954 | Greenwald | 138/122 |
| 2,714,395 | * | 8/1955 | Epstein | 126/307 R |
| 2,858,854 | * | 11/1958 | Daggett | 138/122 |
| 3,313,319 | * | 4/1967 | Osborn et al. | 138/121 |
| 3,332,446 | * | 7/1967 | Mann | 138/114 |
| 3,383,875 | * | 5/1968 | Haas | 138/113 |
| 3,397,440 | * | 8/1968 | Dalin | 165/184 |
| 3,547,160 | * | 12/1970 | McLarty | 138/121 |
| 3,595,275 | * | 7/1971 | Steans et al. | 138/148 |
| 3,730,073 | * | 5/1973 | Potter | 454/44 |
| 4,121,623 | * | 10/1978 | Rhone | 138/114 |
| 4,130,904 | * | 12/1978 | Whalen | 138/122 |
| 4,306,491 | * | 12/1981 | Reardon, Jr. | 126/307 R |
| 4,502,370 | * | 3/1985 | Baileys et al. | 126/307 R |
| 4,570,678 | * | 2/1986 | Ziemek et al. | 138/114 |
| 4,608,963 | * | 9/1986 | Townsend et al. | 126/307 R |
| 4,666,189 | * | 5/1987 | Taylor et al. | 126/307 R |
| 4,724,750 | * | 2/1988 | Coleman et al. | 126/307 R |
| 4,731,967 | * | 3/1988 | McLaughlin | 126/307 R |
| 4,774,931 | * | 10/1988 | Urso | 126/307 R |
| 4,846,147 | * | 7/1989 | Townsend et al. | 126/307 R |
| 4,852,616 | * | 8/1989 | Holcomb | 138/121 |
| 4,966,202 | * | 10/1990 | Bryan et al. | 138/122 |
| 5,127,441 | * | 7/1992 | Rains | 138/114 |
| 5,315,984 | * | 5/1994 | Bauer | 126/307 R |
| 5,358,358 | | 10/1994 | Tassone et al. | |
| 5,393,260 | * | 2/1995 | Barth | 138/114 |
| 5,669,374 | * | 9/1997 | Valters et al. | 126/80 |

FOREIGN PATENT DOCUMENTS 2318860   5/1998  (GB) .

* cited by examiner

Primary Examiner—Ira S. Lazarus
Assistant Examiner—David Lee
(74) Attorney, Agent, or Firm—Bliss McGlynn, P.C.

(57) ABSTRACT

A flue ducting for atmospheric boilers is disclosed and comprises two coaxial generally tubular ducts 10, 11, and a generally undulating linear spacer 12 between said ducts. Linear features are provided on the mutually facing surfaces of the ducts, the features being shaped to engage the undulating spacer 12. One end of the annular space between the ducts 10, 11 is closed.

12 Claims, 1 Drawing Sheet

FLUE DUCTING FOR ATMOSPHERIC BOILERS

Figure 1:
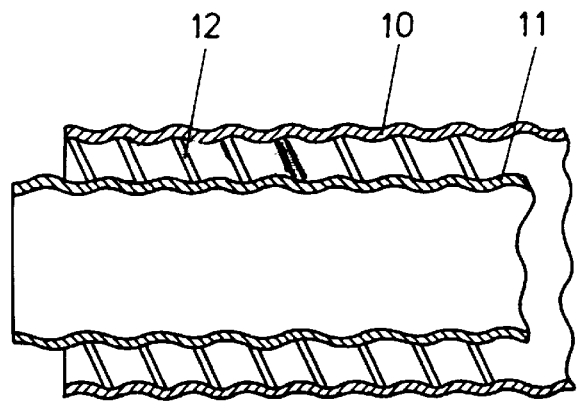

The present invention is concerned with atmospheric boilers and more particularly with a novel form of ducting for use with such boilers.

While conventional atmospheric boilers require only a unitary or single-layer ducting system to convey discharge gases to the atmosphere, double-walled ducting may be adopted in some situations. For example, by encircling the discharge duct with a concentric outer wall, it is possible to form an annular space by means of which the gas being discharged is insulated from the surroundings by air in that space, thereby maintaining the temperature of the gas until it is eventually discharged from the flue. In this way, undesirable condensation into the flue of liquid from the gas is minimised or prevented.

Although it is possible to construct a double-walled duct by installing independent lengths of unitary ducting concentrically at the site of intended use, it is potentially easier to make use of double-walled ducting for this purpose. However, such ducting is usually required to follow a non-linear path from the boiler to the eventual discharge point and therefore specific components, for example elbow bends and other connectors, are needed for this purpose. Double-walled ducting with flexible inner walls has been devised but is not much favoured as there is a serious possibility of the inner wall sagging in horizontal ducting runs.

It is an object of the present invention to provide a novel form of flue ducting for atmospheric boilers, by means of which at least some of the disadvantages of conventional such ducting are overcome and/or positive advantages are conveyed.

The flue ducting according to the present invention comprises two coaxial generally tubular ducts, a generally undulating linear spacer between said ducts, and linear features on the mutually facing surfaces of said ducts, said features being shaped to engage said undulating spacer, one end of the annular space between the ducts being closed.

It is an important beneficial feature of the flue ducting according to the present invention that the undulating linear spacer maintains the mutual spacing-apart of the two coaxial ducts, thereby preserving the integrity of the annular space between the ducts even when the ducts are bent into a nonlinear configuration. Thus the ducting for an associated atmospheric boiler may be modified to adapt to a required non-linearity of the ducting without the provision of pre-formed duct bends or other junction pieces.

In order to enable the two coaxial ducts to be shaped to form bends between the ends of the flue ducting, the outer and/or the inner flue duct may be constructed of a material which can be bent without harm to its integrity. For example, the duct may be of a material which has inherent flexibility or, more preferably, the duct may be of a material which is of low inherent flexibility, for example of a metal such as steel or aluminium, but formed in a construction by which a degree of overall flexibility is imparted. By way of example, each or either duct may be formed of a strip material wound helically to give a generally tubular duct of some flexibility.

Additional flexibility, for example of the inner duct in particular, may be afforded by forming the duct from two or more superimposed layers of reduced thickness. For example, the inner duct may comprise two thicknesses of aluminium, each 0.006 inches thick.

Each of the two coaxial ducts has, in its surface facing the other duct, a linear feature designed to engage an undulating spacer. By way of example, that feature may be a continuous or discontinuous spiral groove formed on or in the duct surface, for example during the constructing of the relevant duct. The generally undulating linear spacer between the ducts may be of undulating spiral form, for example a continuous coil with undulations superimposed on the coils of the spiral. Most preferably, the spacer is made of a resilient material, for example in the overall form of a coiled spring.

When one or both of the coaxial ducts is formed of a material and/or in a construction by means of which it/their overall length and/or diameter may be varied, it is possible thereby to modify the radial dimension of the annular space between the ducts. By this means, the size of this space may be reduced to, say, one inch or less, and in particular to preferred values of the order of one half or one quarter of an inch.

One end of the annular space between the ducts is closed in use. When the ducting has been installed to convey to atmosphere the flue gases from an atmospheric boiler, that end of the annular cavity which is uppermost and nearer to the discharge terminal is the closed end. The cavity may be closed by a sealing ring, the other end of the annular cavity, nearer to the boiler, being left open to admit access of ambient air to the cavity. The air thus admitted to the cavity and retained therein effectively insulates boiler waste gas within the innermost duct from the potentially cooling effect of the ambient atmosphere and assists in maintaining the temperature of the waste gas above its dew point.

Figure 2:
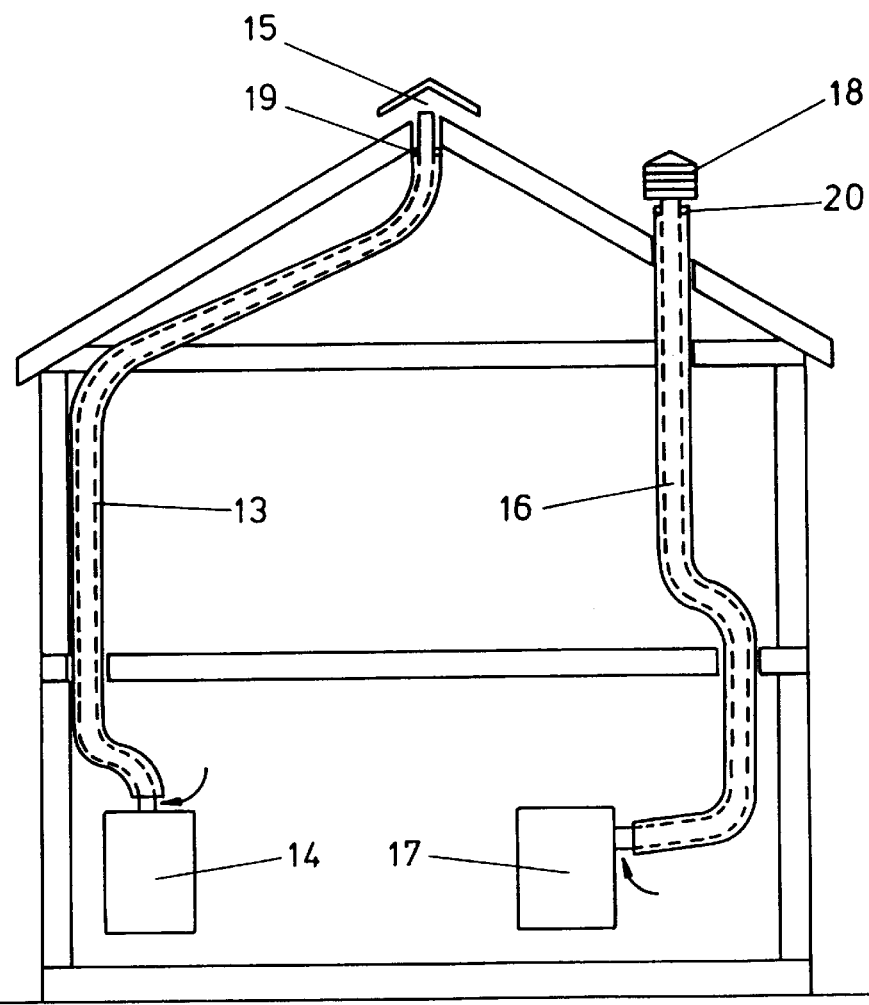

The invention will now be further described with reference to the accompanying drawings, which illustrate, by way of example, an embodiment of the present invention in use for conveying waste gases from an atmospheric boiler and wherein:

FIG. 1 is a radial sectional view of a part of a length of ducting according to the invention; and FIG. 2 is a simplified elevation showing two forms of installation incorporating the ducting.

Referring firstly to FIG. 1, the ducting there illustrated comprises two coaxial pipes 10, 11, each formed of aluminium continuous strip material wound and seamed to give a pipe having an undulating cross-section. A coil spring 12 having a continuously undulating profile engages the opposed faces of the pipes 10, 11. By virtue of the form of construction of the two pipes, and more particularly by virtue of the construction and resilience of the spring 12, the assembled ducting may be adapted to a non-linear form to take account of non-linear features, for example smooth bends, of the required path of the ducting as installed.

Thus, as illustrated in FIG. 2, the ducting 13 by which waste gas is conveyed from a top-vent boiler 14 to the gas discharge outlet 15, and the ducting 16 by which waste gas is conveyed from a side vent boiler 17 to the terminator 18, both readily assume the orientation required.

At the boiler end of each length of ducting 13, 16, the space between the inner and outer pipes is left open, to permit the ingress of air as indicated by the arrows. The waste gas is carried by the inner pipe. At the upper end of each length of ducting, a sealing ring, 19 or 20, is included to close off the annular space between the inner and outer ducting lengths. Thus air admitted at the lower end of the ducting is retained in that annular space and serves to insulate the waste gases within the inner ducting from the cooling effect of the ambient atmosphere, which otherwise may lead to undesirable condensation within the inner ducting.

Referring again to FIG. 1, the outer pipe 10 may have a continuous helical groove in the inner wall thereof, and the inner pipe 11 may have a continuous helical groove in the outer wall thereof. The wall thicknesses of the pipes 10, 11 are generally constant over their lengths such that the inner and outer surfaces of the pipes are generally corrugated or ridged.

The coil spring 12 is in the form of an undulating length of wire and is positioned between the outer and inner pipes 10, 11 to locate the pipes coaxially relative to one another. The peaks of the undulations of the spring 12 are received within the groove in the inner wall of the outer pipe 10, and the troughs of the undulations are received within the groove in the outer wall of the inner pipe 11

The inner and outer pipes 10, 11 are conveniently each made from metal strips fed simultaneously and continuously from associated coils, and the length of spring 12 is fed at the same time between the inner and outer pipes during their formation. The spring 12 is preferably of stainless steel wire, typically 1.5 mm in diameter.

The helical nature of the grooves in the pipes 10, 11 and of the spring 12 enables the inner and outer pipes 10, 11 to be screwed relative to one another about the spring 12 such that the longitudinal positions of the inner and outer pipes 10, 11 relative to each other can be altered. Furthermore, the spring 12 can be more tightly wound around the inner pipe 11, to enable closer spacing of the inner and outer pipes 11, 12 relative to each other.

It will be appreciated by persons skilled in the art that the above embodiment has been described by way of example only, and not in any limitative sense, and that various alterations and modifications are possible without departure from the scope of the invention as defined by the appended claims. For example, instead of being a continuous coil, the undulating linear spacer could be a continuous strip having spaced apart protrusions thereon.

What is claimed is:

1. A flue ducting comprising concentric inner and outer pipes defining an annular air space therebetween extending a length of the ducting, corresponding helical grooves being formed in opposed surfaces of the inner and outer pipes to extend the length of the pipes, and a helically coiled spring being located in said grooves to react between the inner and outer pipes, said helically coiled spring having individual coils which are of undulating shape defining alternating peaks and troughs therearound with the peaks therein engaging in the helical groove in the outer pipe and the troughs therein engaging in the helical groove in the inner pipe to determine and maintain the space between the inner and outer pipes, a flexibility of the ducting so formed enabling the length and a longitudinal configuration thereof to be varied, one end of the annular space between the pipes being closed.

2. A ducting according to claim 1, wherein the outer and/or the inner pipe is constructed of a material which can be bent without harm to its integrity.

3. A ducting according to claim 2, wherein the pipe is of a material which has inherent flexibility.

4. A ducting according to claim 3, wherein the pipe is of a material which is of low inherent flexibility, but formed in a construction by which a degree of overall flexibility is imparted.

5. A ducting according to claim 4, wherein each or either pipe is formed of a strip material wound helically to give a generally tubular duct of some flexibility.

6. A ducting according to claim 4, wherein said material of low inherent flexibility is a metal comprising either one of steel and aluminum.

7. A ducting according to claim 1, wherein each or either pipe is formed from two or more superimposed layers of reduced thickness.

8. A ducting according to claim 1, wherein said helical grooves are a continuous or discontinuous spiral groove formed on or in the duct surface.

9. A ducting according to claim 1, wherein said spring between the pipes is of undulating spiral form.

10. A ducting according to claim 9, wherein said spring is a continuous coil with undulations superimposed on the coils of the spiral.

11. A ducting according to claim 1, wherein said spring is made of a resilient material.

12. A ducting according to claim 1, wherein the annular air space between the pipes is closed by a sealing ring.

* * * * *